United States Patent  
Hoyos

(10) Patent No.: US 9,294,475 B2  
(45) Date of Patent: *Mar. 22, 2016

(54) SYSTEM AND METHOD FOR GENERATING A BIOMETRIC IDENTIFIER

(71) Applicant: Hoyos Labs IP Ltd., Oxford (GB)

(72) Inventor: Hector Hoyos, New York, NY (US)

(73) Assignee: HOYOS LABS IP, LTD., Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,499

(22) Filed: Mar. 7, 2014

(65) Prior Publication Data

US 2014/0337949 A1 Nov. 13, 2014

Related U.S. Application Data

(60) Provisional application No. 61/822,746, filed on May 13, 2013, provisional application No. 61/842,800, filed on Jul. 3, 2013, provisional application No. 61/842,739, filed on Jul. 3, 2013, provisional (Continued)

(51) Int. Cl.

| G06F 21/32 | (2013.01) |
|---|---|
| H04L 29/06 | (2006.01) |
| G06Q 20/40 | (2012.01) |

(Continued)

(52) U.S. Cl.

CPC ........ H04L 63/0861 (2013.01); G06Q 20/3276 (2013.01); G06Q 20/40145 (2013.01); G07F 19/20 (2013.01); G06F 21/32 (2013.01)

(58) Field of Classification Search

CPC ..................... H04L 63/0861; G06Q 20/40145; G06Q 20/3276; G07F 19/20; G06F 21/32

See application file for complete search history.

(56) References Cited

U.S. PATENT DOCUMENTS 6,480,615 B1 * 11/2002 Sun et al. ...................... 382/103  
6,792,159 B1 * 9/2004 Aufrichtig ............. H04N 5/367  
348/E5.081

(Continued)

FOREIGN PATENT DOCUMENTS

WO  WO 2013147763 A1 * 10/2013

OTHER PUBLICATIONS

Elmongui, "Spatio-Temporal Histograms," Department of Computer Science, Purdue University, West Lafayette, IN, USA, Springer-Verlag Berlin Heidelberg, 2005, pp. 19-36.*

(Continued)

*Primary Examiner* — Jung Kim  
*Assistant Examiner* — James J Wilcox  
(74) *Attorney, Agent, or Firm* — Leason Ellis LLP

(57) ABSTRACT

Systems and methods are provided for recording a user's biometric features and generating an identifier representative of the user's biometric features using mobile device such as a smartphone. The systems and methods described herein enable a series of operations whereby a user using a mobile device can capture imagery of a user's face, eyes and periocular region. The mobile device is also configured analyze the imagery to identify and determine the position of low-level features spatially within the images and the changes in position of the low level features dynamically throughout the images. Using the spatial and dynamic information the mobile device is further configured to generate a biometric identifier characterizing the user's biometric features and which can be used to identify/authenticate the user by comparing the biometric identifier to a previously generated biometric identifier.

14 Claims, 6 Drawing Sheets

Related U.S. Application Data application No. 61/842,757, filed on Jul. 3, 2013, provisional application No. 61/842,756, filed on Jul. 3, 2013, provisional application No. 61/921,004, filed on Dec. 26, 2013, provisional application No. 61/920,985, filed on Dec. 26, 2013, provisional application No. 61/922,438, filed on Dec. 31, 2013, provisional application No. 61/924,092, filed on Jan. 6, 2014, provisional application No. 61/924,097, filed on Jan. 6, 2014.

(51) Int. Cl.
*G07F 19/00* (2006.01)
*G06Q 20/32* (2012.01)

(56) References Cited

U.S. PATENT DOCUMENTS

| | | | |
|---|---|---|---|
| 7,643,659 B2* | 1/2010 | Cao | G06K 9/00234 382/115 |
| 8,370,639 B2* | 2/2013 | Azar | G06F 21/32 713/186 |
| 8,457,367 B1 | 6/2013 | Sipe et al. | |
| 8,558,663 B2* | 10/2013 | Newman | G06Q 20/40 235/379 |
| 8,570,431 B2* | 10/2013 | Kawashima | H04N 5/23219 348/345 |
| 8,792,679 B2* | 7/2014 | Sengupta | G06K 9/00248 382/103 |
| 8,958,608 B2* | 2/2015 | Santos-Villalobos et al. | 382/117 |
| 8,994,499 B2* | 3/2015 | Zhao | G06F 21/32 340/5.53 |
| 9,124,571 B1* | 9/2015 | Lin | H04L 63/0823 |
| 2005/0207614 A1* | 9/2005 | Schonberg | G06K 9/00597 382/100 |
| 2007/0154096 A1* | 7/2007 | Cao | G06K 9/00234 382/190 |
| 2007/0286462 A1* | 12/2007 | Usher | G06K 9/0061 382/115 |
| 2009/0232361 A1* | 9/2009 | Miller | 382/115 |
| 2010/0014720 A1 | 1/2010 | Hoyos et al. | |
| 2013/0042314 A1 | 2/2013 | Kelley | |
| 2013/0222603 A1* | 8/2013 | Agranov et al. | 348/164 |
| 2013/0227651 A1* | 8/2013 | Schultz | G06F 21/32 726/4 |
| 2013/0267204 A1* | 10/2013 | Schultz et al. | 455/411 |
| 2013/0269013 A1* | 10/2013 | Parry et al. | 726/7 |
| 2013/0336547 A1* | 12/2013 | Komogortsev | 382/117 |
| 2014/0037152 A1* | 2/2014 | Tan et al. | 382/117 |
| 2014/0090039 A1 | 3/2014 | Bhow | |
| 2014/0337930 A1* | 11/2014 | Hoyos | H04L 63/10 726/4 |

OTHER PUBLICATIONS

Chetty, "Multi-Level Liveness Verification for Face-Voice Biometric Authentication," School of Information Sciences and Engineering, University of Canberra, Australia, IEEE, 2006, pp. 1-6.*

* cited by examiner

SYSTEM AND METHOD FOR GENERATING A BIOMETRIC IDENTIFIER

CROSS-REFERENCE TO RELATED APPLICATIONS

The present application is related to and includes U.S. Patent Application Ser. No. 61/822,746, entitled "SYSTEM AND METHOD FOR PROVIDING BIOMETRICALLY AUTHENTICATED ACCESS USING MOBILE DEVICES" filed May 31, 2013; U.S. Patent Application Ser. No. 61/842,800, entitled "SYSTEM AND METHOD FOR PROVIDING BIOMETRICALLY AUTHENTICATED ACCESS USING MOBILE DEVICES" filed Jul. 3, 2013; U.S. Patent Application Ser. No. 61/842,739, entitled "SECURE BACK-END ARCHITECTURE SYSTEM AND METHOD" filed Jul. 3, 2013; U.S. Patent Application Ser. No. 61/842,757, entitled "SYSTEM AND METHOD FOR GENERATING A BIOMETRIC IDENTIFIER" filed Jul. 3, 2013; U.S. Patent Application Ser. No. 61/842,756, entitled "SYSTEMS AND METHODS FOR DETERMINING LIVENESS" filed Jul. 3, 2013; U.S. Provisional Patent Application Ser. No. 61/921,004, entitled "SYSTEM AND METHOD FOR DETERMINING LIVENESS" filed Dec. 26, 2013; U.S. Provisional Patent Application Ser. No. 61/920,985, entitled "SYSTEM AND METHOD FOR GENERATING A BIOMETRIC IDENTIFIER" filed Dec. 26, 2013; U.S. Provisional Patent Application Ser. No. 61/622,438, entitled "SYSTEM AND METHOD FOR BIOMETRIC PROTOCOL STANDARDS" filed Dec. 31, 2013; U.S. Patent Application Ser. No. 61/924,092, entitled "SECURE BACK-END ARCHITECTURE SYSTEM AND METHOD" filed Jan. 6, 2014; U.S. Patent Application Ser. No. 61/924,097, entitled "SYSTEM AND METHOD FOR SMARTPHONE SECURITY CASE" filed Jan. 6, 2014; U.S. patent application Ser. No. 14/201,462, entitled "SYSTEMS AND METHODS FOR DETERMINING LIVENESS" filed on even date herewith; U.S. patent application Ser. No. 14/201,438, entitled "SYSTEMS AND METHODS FOR BIOMETRIC AUTHENTICATION OF TRANSACTIONS" filed on even date herewith, which are each hereby incorporated by reference as if set forth in their respective entireties herein.

TECHNICAL FIELD OF THE INVENTION

The present invention relates to systems and methods for capturing and characterizing biometric features, in particular, systems and methods for capturing and characterizing facial biometric features using a mobile device for the purposes of identifying or authenticating a user.

BACKGROUND OF THE INVENTION

As a biometric is a biological characteristic (such as a fingerprint, the geometry of a hand, Retina pattern, iris shape, etc.) of an individual, biometric techniques can be used as an additional verification factor since biometrics are usually more difficult to obtain than other non-biometric credentials. Biometrics can be used for identification and/or authentication (also referred to as identity assertion and/or verification).

Biometric identity assertion can require a certain level of security as dictated by the application. For example, authentication in connection with a financial transaction or gaining access to a secure location requires higher security levels. As a result, preferably, the accuracy of the biometric representation of a user is sufficient to ensure that the user is accurately authenticated and security is maintained. However, to the extent iris, face, finger, and voice identity assertion systems exist and provide the requisite level of accuracy, such systems require dedicated devices and applications and are not easily implemented on conventional smartphones, which have limited camera resolution and light emitting capabilities.

The challenges surrounding traditional biometric feature capture techniques, which generally require high resolution imagery, multi-spectral lighting and significant computing power to execute the existing image analysis algorithms to achieve the requisite accuracy dictated by security have made biometric authentication not widely available or accessible to the masses. Moreover, traditional biometric authentication techniques requiring dedicated devices used in a specific way (e.g., require a cooperative subject, have a narrow field of view, biometric must be obtained in a specific way) detracts from user convenience and wide-scale implementation.

Accordingly, there is a need for systems and methods with which a user's identity can be verified conveniently, seamlessly, and with a sufficient degree of accuracy, from biometric information captured from the user using readily available smartphones. In addition, what is needed are identity assertion systems and methods that, preferably, are not reliant on multi-spectral imaging devices, multi-spectral light emitters, high resolution cameras, or multiple user inputs.

SUMMARY OF THE INVENTION

Technologies are presented herein in support of a system and method for authorizing a user in connection with a transaction at a transaction terminal.

According to a first aspect, the method for authenticating a user according to the user's biometric features includes the steps of causing, by a mobile device having a camera, a storage medium having instructions stored therein and a processor configured by executing the instructions therein, the camera to capture a plurality of images depicting at least one facial region of the user. Using the plurality of images, the mobile device processor detects low-level features depicted in a first image of the plurality of images. In addition, the mobile device processor determines a position of a first low-level feature relative to a respective position of one or more other low-level features. In addition, the method includes determining, by the mobile device processor, at least one second position of the first low-level feature in at least one other image. Using the identified positions, the mobile device processor calculates changes in position of the first low-level feature. The method also includes, generating, by the mobile device processor, a biometric identifier useable to identify the user as a function of the position of the first low-level feature depicted in the first image and the calculated changes in position of the first low-level feature. In addition, the method includes, authenticating the user by comparing the biometric identifier to at least one previously generated biometric identifier.

According to another aspect, a system is provided for authenticating a user according to the user's biometric features. The system includes one or more processors configured to interact with a camera, a communication interface and a computer-readable storage medium and execute one or more software modules stored on the storage medium. The software modules include a biometric capture module that, when executed by the processor, configures the processor to cause a camera in communication with the processor to capture a plurality of images, wherein the plurality of images depict at least one facial region of the user. The modules also include an analysis module that, when executed by the processor, configures the processor to detect low-level features depicted in a first image of the plurality of images, determine a position of the first low-level feature relative to at least one other low-level feature, determine at least one second position of the first low-level feature in at least one other image, calculate changes in position of the first low-level feature, generate a biometric identifier useable to identify the user as a function of the first position of the first low-level feature and the calculated changes in position of the first low-level feature. The software modules also include a biometric authentication module that, when executed by the processor, configures the processor to authenticate the user by comparing the biometric identifier to at least one previously generated biometric identifier.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
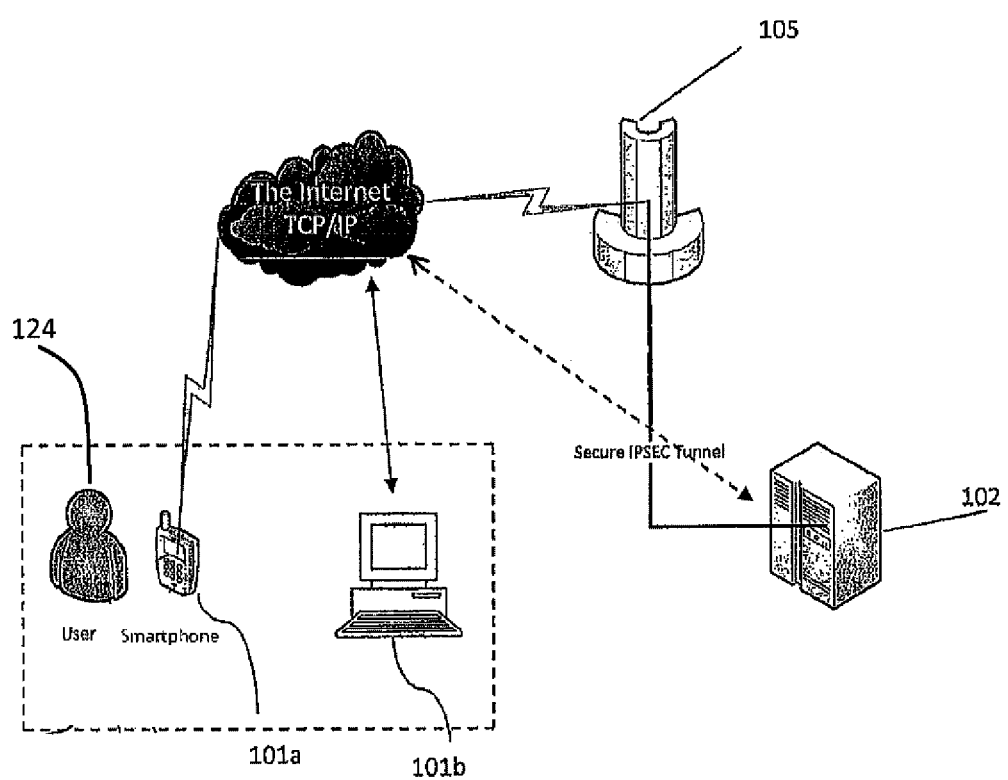
FIG. 1 is a high-level diagram of a computer system for authenticating a user according to the user's biometric features in accordance with at least one embodiment disclosed herein.

By way of example only and for the purpose of overview and introduction, embodiments of the present invention are described below which concern a system and method for capturing a user's biometric features and generating an identifier characterizing the user's biometric features using a mobile device such as a smartphone. The biometric identifier is preferably generated for the purposes of identifying or authenticating the user (e.g., verifying) according to the biometric identifier.

In some implementations, the system includes a cloud based system server platform that communicates with fixed PC's, servers, and devices such as laptops, tablets and smartphones operated by users. As the user attempts to access a networked environment that is access controlled, for example, a website which requires a secure login, the user is prompted to authenticate using the user's preregistered mobile device. Authentication includes capturing biometric information in the form of at least images of the user's eyes, periocular region and face or any combination of the foregoing (collectively referred to as the Vitruvian region), extracting unique features and encoding the features as a biometric identifier ("Vitruvian identifier") using the mobile device. Accordingly, the user can be verified by the mobile device and/or the system server or a combination of the foregoing by comparing the Vitruvian biometric identifier to a Vitruvian identifier generated during the user's initial enrollment with the system.

According to a salient aspect of the subject application, capturing images for the purpose of identifying a user's Vitruvian biometric features can be performed using conventional digital cameras that are found on smart phones and other such mobile devices. In addition, identifying Vitruvian biometric features can be performed according to positive eye authentication techniques, preferably, applying algorithms analyzing the iris and/or periocular regions and/or face without requiring infra-red images or IR emitters which are not widely integrated in smartphones.

According to a salient aspect of the subject application, biometric features from the user's iris, periocular and/or facial regions can be extracted concurrently and seamlessly from common image captures (e.g., the same image frames and same sequence of image frames captured), whereas, current identification techniques extract iris features from certain image frames and periocular features from other image frames. Moreover, according to another salient aspect of the subject application, Vitruvian biometric features are identified and defined according to the spatial relationship of features ("keypoints") within frames and the dynamic movement or position ("flow") of those keypoints throughout a temporally arranged sequence of frames, so as to seamlessly generate an integrated Vitruvian biometric identifier of the user's Vitruvian region. The resulting integrated Vitruvian biometric identified is a single, virtual representation of the user's Vitruvian region, as opposed to, independently generating a plurality of separate biometric identifiers (e.g., one for the iris, another for the periocular region) that are later fused.

Another salient aspect of the subject application is that the foregoing process for generating a biometric identifier can also be used to generate a liveness identifier and/or determine "liveness" (e.g., whether the image sequence is of living person).

An exemplary system for authenticating a user according to the user's biometric features 100 is shown as a block diagram in FIG. 1. In one arrangement, the system consists of a system server 105 and user devices including a mobile device 101a and a user computing device 101b. The system 100 can also include one or more remote computing devices 102.

The system server 105 can be practically any computing device and/or data processing apparatus capable of communicating with the user devices and remote computing devices and receiving, transmitting and storing electronic information and processing requests as further described herein. Similarly, the remote computing device 102 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud based computing devices.

In some implementations, computing device 102 can be associated with an enterprise organization, for example, a bank or a website, that maintain user accounts ("enterprise accounts") and provide services to enterprise account holders and require authentication of the user prior to providing the user access to such systems and services.

The user devices, mobile device 101a and user computing device 101b, can be configured to communicate with one another, the system server 105 and/or remote computing device 102, transmitting electronic information thereto and receiving electronic information therefrom as further described herein. The user devices can also be configured to receive user inputs as well as capture and process biometric information, for example, digital images and voice recordings of a user 124.

The mobile device 101a can be any mobile computing devices and/or data processing apparatus capable of embodying the systems and/or methods described herein, including but not limited to a personal computer, tablet computer, personal digital assistant, mobile electronic device, cellular telephone or smart phone device and the like. The computing device 101b is intended to represent various forms of computing devices that a user can interact with, such as workstations, a personal computer, laptop computer, dedicated point-of-sale systems, ATM terminals, access control devices or other appropriate digital computers.

As further described herein, the system for authenticating a user according to the user's biometric features 100, facilitates the authentication of a user 124 according to a user's biometric features using a mobile device 101a. In some implementations, identification and/or authentication according to a user's biometric features utilizes a user's biometric information in a two stage process. The first stage is referred to as enrollment. In the enrollment stage samples of appropriate biometric(s) is/are collected from an individual. These biometrics are analyzed and processed to extract features (or characteristics) present in each sample. The set of features present in the biometric of an individual constitutes an identifier for the person. These identifiers are then stored to complete the enrolment stage. In the second stage the same biometric of the individual is measured. Features from this biometric are extracted just like in the enrollment phase to obtain a current biometric identifier. If the goal is identification, then this identifier is searched for in the database of identifiers generated in the first phase. If a match occurs, the identification of the individual is revealed, otherwise identification fails. If the goal is authentication, then the identifier generated in the second stage is compared with the identifier generated in the first stage for the particular person. If a match occurs, authentication is successful, otherwise authentication fails.

It should be noted that while FIG. 1 depicts the system for authenticating a user according to the user's biometric features 100 with respect to a mobile device 101a and a user computing device 101b and a remote computing device 102, it should be understood that any number of such devices can interact with the system in the manner described herein. It should also be noted that while FIG. 1 depicts a system for authenticating a user according to the user's biometric features 100 with respect to the user 124, it should be understood that any number of users can interact with the system in the manner described herein.

It should be further understood that while the various computing devices and machines referenced herein, including but not limited to mobile device 101a and system server 105 and remote computing device 102 are referred to herein as individual/single devices and/or machines, in certain implementations the referenced devices and machines, and their associated and/or accompanying operations, features, and/or functionalities can be combined or arranged or otherwise employed across any number of such devices and/or machines, such as over a network connection or wired connection, as is known to those of skill in the art.

It should also be understood that the exemplary systems and methods described herein in the context of the mobile device 101a are not specifically limited to the mobile device and can be implemented using other enabled computing devices (e.g., the user computing device 102b).

Figure 2A:
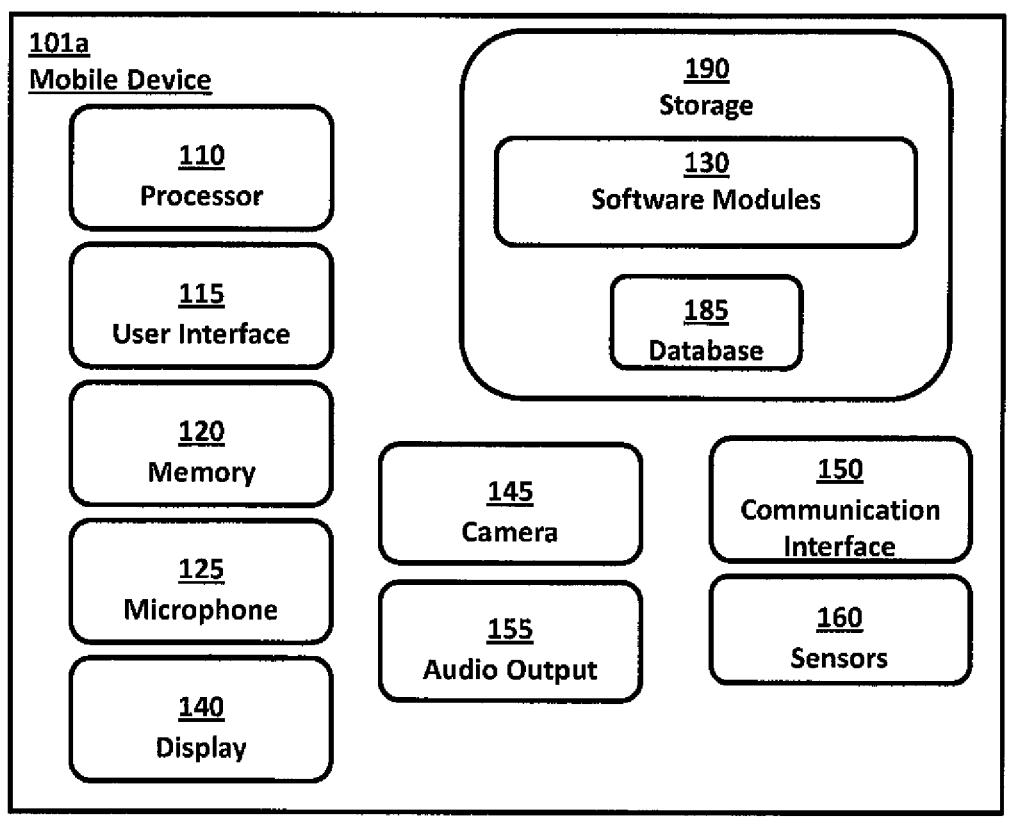
FIG. 2A is a block diagram of a computer system for authenticating a user according to the user's biometric features in accordance with at least one embodiment disclosed herein.

In reference to FIG. 2A, mobile device 101a of the system 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2B:
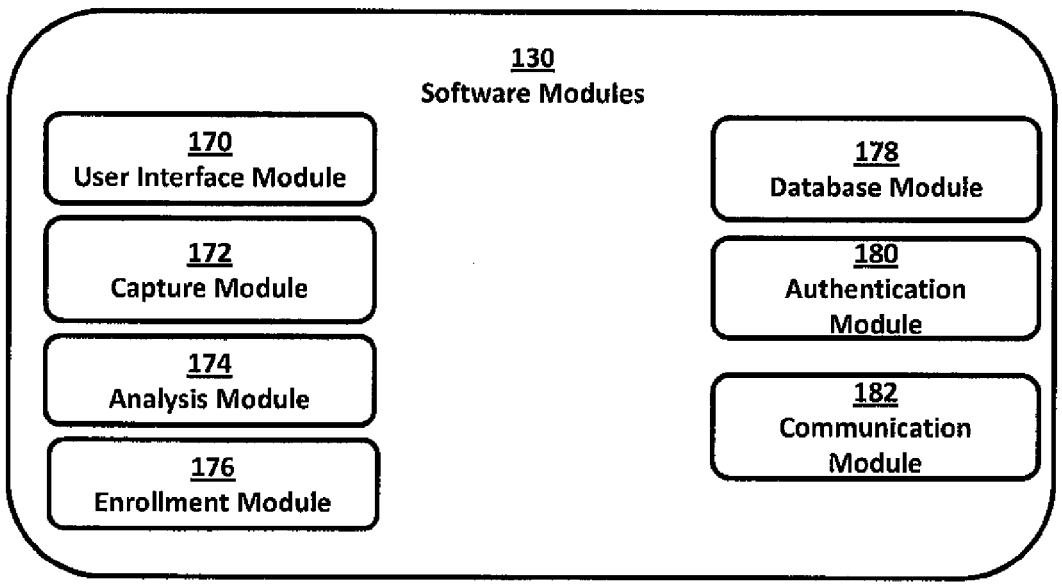
FIG. 2B is a block diagram of software modules for authenticating a user according to the user's biometric features in accordance with at least one embodiment disclosed herein.

One or more software modules 130 are encoded in the storage 190 and/or in the memory 120. The software modules 130 can comprise one or more software programs or applications having computer program code or a set of instructions (referred to as the "mobile authentication client application") executed in the processor 110. As depicted in FIG. 2B, preferably, included among the software modules 130 is a user interface module 170, a biometric capture module 172, an analysis module 174, an enrollment module 176, a database module 178, an authentication module 180 and a communication module 182 that are executed by processor 110. Such computer program code or instructions configure the processor 110 to carry out operations of the systems and methods disclosed herein and can be written in any combination of one or more programming languages.

The program code can execute entirely on mobile device 101, as a stand-alone software package, partly on mobile device, partly on system server 105, or entirely on system server or another remote computer/device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system for biometric authentication 100. In addition, it should be noted that other information and/or data relevant to the operation of the present systems and methods (such as database 185) can also be stored on storage. Preferably, such information is stored on an encrypted data-store that is specifically allocated so as to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 101a and/or system server 105 can be encrypted using a user's biometric information, liveness information, or mobile device information as an encryption key. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user 100. The information stored in database can include but is not limited to a user profile, as will be described in greater detail herein. It should be noted that although database is depicted as being configured locally to mobile device 101a, in certain implementations the database and/or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touch-screen, microphone, etc. as would be understood in the art of electronic computing devices. User Interface serves to facilitate the capture of commands from the user such as an on-off commands or user information and settings related to operation of the system for authenticating a user 100. For example, interface serves to facilitate the capture of certain information from the mobile device 101 such as personal user information for enrolling with the system so as to create a user profile.

The computing device 101a can also include a display 140 which is also operatively connected to processor the processor 110. The display includes a screen or any other such presentation device which enables the system to instruct or otherwise provide feedback to the user regarding the operation of the system for authenticating a user 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

Mobile device 101a also includes a camera 145 capable of capturing digital images. The camera can be one or more imaging devices configured to capture images of at least a portion of the user's body including the user's eyes and/or face while utilizing the mobile device 101a. The camera serves to facilitate the capture of images of the user for the purpose of image analysis by the mobile device processor executing the secure authentication application which includes identifying biometric features for (biometrically) authenticating the user from the images. The mobile device 101a and/or the camera 145 can also include one or more light or signal emitters (not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. Alternatively, the camera can be external to the mobile device 101a. The possible variations of the camera and light emitters would be understood by those skilled in the art. In addition, the mobile device can also include one or more microphones 104 for capturing audio recordings as would be understood by those skilled in the art.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101.

Various hardware devices/sensors 160 are also operatively connected to the processor. The sensors 160 can include: an on-board clock to track time of day, etc.; a GPS enabled device to determine a location of the mobile device; an accelerometer to track the orientation and acceleration of the mobile device; Gravity magnetometer to detect the Earth's magnetic field to determine the 3-dimensional orientation of the mobile device; proximity sensors to detect a distance between the mobile device and other objects; RF radiation sensors to detect the RF radiation levels; and other such devices as would be understood by those skilled in the art.

Communication interface 150 is also operatively connected to the processor 110 and can be any interface that enables communication between the mobile device 101a and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

At various points during the operation of the system for authenticating a user conducting a financial transaction 100, the mobile device 101a can communicate with one or more computing devices, such as system server 105, user computing device 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
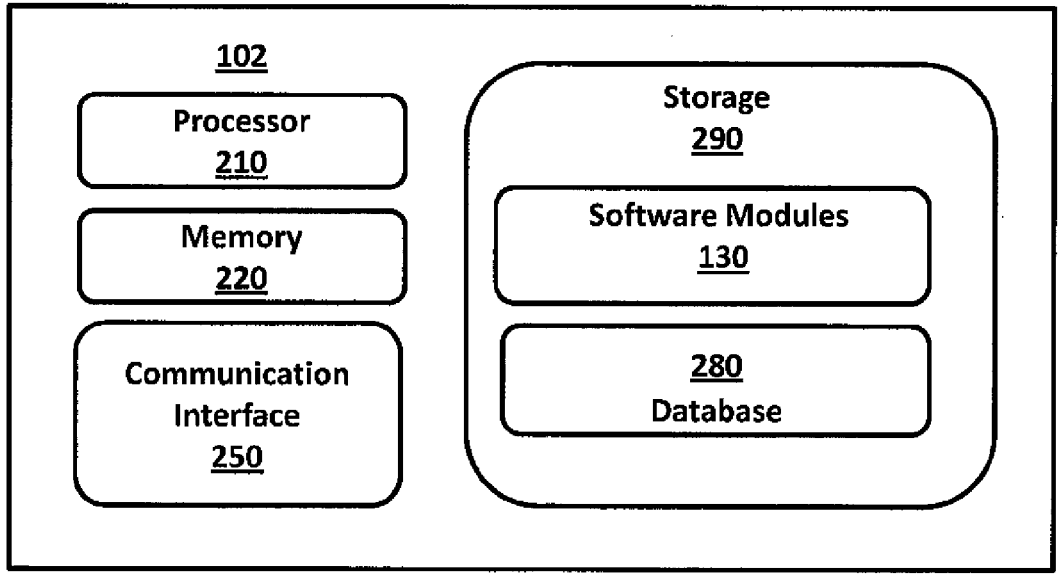
FIG. 2C is a block diagram of a computer system for authenticating a user according to the user's biometric features in accordance with at least one embodiment disclosed herein.

FIG. 2C is a block diagram illustrating an exemplary configuration of system server 105. System server 105 can include a processor 210 which is operatively connected to various hardware and software components that serve to enable operation of the system for facilitating secure authentication of transactions at a terminal 100. The processor 210 serves to execute instructions to perform various operations relating to user authentication and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 130 are encoded in the storage 290 and/or in the memory 220. The software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101a and/or user computing device 101b, or entirely on such remote computing devices. As depicted in FIG. 2B, preferably, included among the software modules 130 are an analysis module 274, an enrollment module 276, an authentication module 280, a database module 278, and a communication module 282, that are executed by the system server's processor 210.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

The operation of the system for authenticating a user according to the user's biometric features 100 and the various elements and components described above will be further appreciated with reference to the method for facilitating the capture of biometric information and authentication as described below. The processes depicted herein are shown from the perspective of the mobile device 101a and/or the system server 105, however, it should be understood that the processes can be performed, in whole or in part, by the mobile device 101a, the system server 105 and/or other computing devices (e.g., remote computing device 102 and/or user computing device 101b) or any combination of the foregoing. It should be appreciated that more or fewer operations can be performed than shown in the figures and described herein. These operations can also be performed in a different order than those described herein. It should also be understood that one or more of the steps can be performed by the mobile device 101a and/or on other computing devices (e.g. computing device 101b, system server 105 and remote computing device 102).

Figure 3:
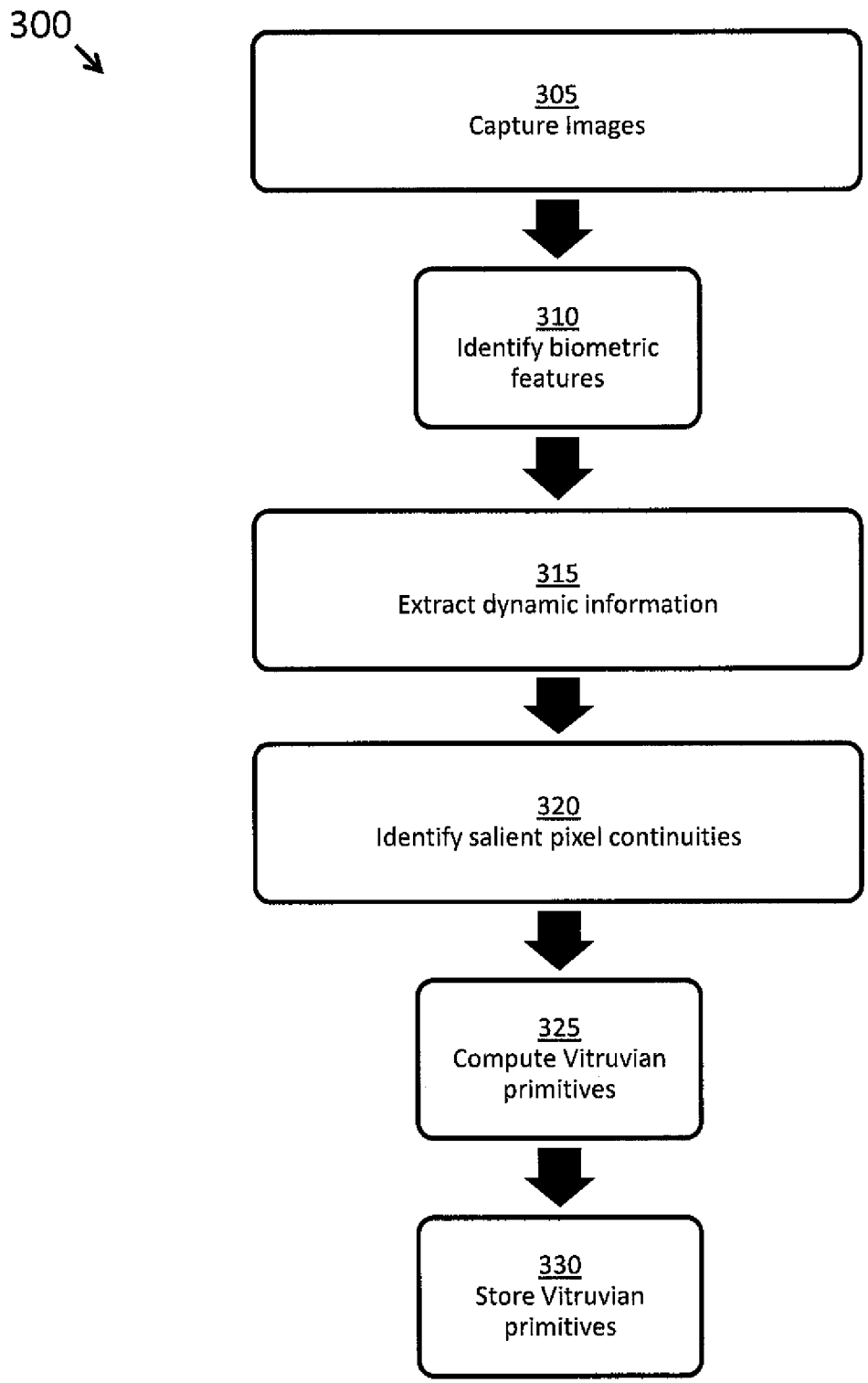
FIG. 3 is a flow diagram showing a routine for generating a biometric identifier according to the user's biometric features in accordance with at least one embodiment disclosed herein.

Turning now to FIG. 3, a flow diagram illustrates a routine 300 for detecting the user's biometric features from a series of images in accordance with at least one embodiment disclosed herein and generating a biometric identifier. In general, the routine includes capturing and analyzing an image sequence of at least the user's eyes, periocular region and surrounding facial region (collectively referred to as the facial region or the Vitruvian region); identifying low-level spatiotemporal features from at least the eyes and periocular regions for the purposes of generating an identifier that compresses the low-level spatiotemporal features (the Vitruvian biometric identifier). As compared to high level features, which generally characterize the overall image frame (e.g., the entire picture of the user's facial region), or intermediate features, which characterize objects within the greater image frames (e.g., the nose), low-level features are frequently used to represent image characteristics and in this case biometric characteristics. Low-level features are preferable in that they are robust for image characterization in that they provide invariance under rotation, size, illuminosity, scale and the like.

The inclusion of the periocular region in generating a biometric identifier can be beneficial in that in images where the iris features alone cannot be reliably obtained (or used), the surrounding skin region may be used to characterize the user's biometric features which can be used to effectively confirm or refute an identity. Moreover, the use of the periocular region represents a balance between using the entire face region and using only the iris for recognition. When the entire face is imaged from a distance, the iris information is typically of low resolution and the extraction of biometric features from the iris modality alone will be poor.

Furthermore, the collective aggregation of low-level periocular features effectively generates a Vitruvian identifier characterizing higher level features, e.g., intermediate level features. The periocular region can be considered to be an intermediate level feature with high performance when it comes to classification of the subject, because, in general, the periocular region provides a high concentration of unique features from which a user can be classified (biometrically).

It should be understood that, according to the disclosed embodiments, the images can be captured and the biometric identifier can be generated using mobile devices (e.g. smartphones) that are widely available and having digital cameras capable of capturing images of the Vitruvian region in the visible spectral bands. However, it should be understood that the disclosed systems and methods can be implemented using computing devices equipped with multispectral image acquisition devices that can image in both the visible and near-IR spectral bands. Such multispectral image acquisition user devices can facilitate capturing the iris texture and the periocular texture.

The process begins at step 305, where the mobile device processor 110 configured by executing one or more software modules 130, including, preferably, the capture module 172, causes the camera 145 to capture an image sequence of at least a portion of the user's (124) Vitruvian region and stores the image sequence in memory. Capturing the image sequence includes detecting, by the mobile device camera 145, light reflected off a portion of the user's Vitruvian region. Preferably, the portion of the user's Vitruvian region includes the user's iris/irises, eye(s), periocular region, face or a combination of the foregoing. In addition, the configured processor can cause the mobile device to emit light, at least in the visible spectrum, to improve the intensity of the reflection captured by the camera. In addition, although not required, the mobile device can also be configured to emit infra-red light to augment the spectrum of reflected light that is captured by the camera. It should be understood that the image sequence includes a plurality of image frames that are captured in sequence over a period of time.

Then at step 310, a first image frame is analyzed and low-level features are identified and their relative positions recorded. More specifically, the mobile device processor 110 configured by executing the software modules 130, including, preferably, the analysis module 172, analyzes a first individual image frame to extract/detect spatial information of the low-level Vitruvian biometric features including, preferably, periocular features. The configured processor can detect the features or "keypoints" by executing a keypoint detection algorithm including but not limited to, SIFT, SURF, FREAK, Binary features, Dense SIFT, ORB or other such algorithms whether known in the art or new. The configured processor encodes each of the keypoints detected using the pixel values (e.g., how bright and what color the pixel is) that correspond to the identified keypoint thereby defining a local key descriptor. These low-level features generally range from 3 to approximately 100 pixels in size, however it should be understood that low-level features are not limited to falling within the aforementioned range. Similar to most image algorithm's descriptors (SIFT, SURF, FREAK, etc.), the set of pixels does not necessarily represent a square area. Each feature's computation entails thorough histogram estimations that are taken, for example, over 16×16 regions. It should be understood that the size of the histogram or region can be considered to represent the strength of the feature and is a non-linear function of pixels (e.g. it is not necessarily a function of image quality).

Then at step 315, a continuous series of subsequent frames are analyzed and spatial and/or dynamic information of the keypoints identified at step 310 is extracted. Using the keypoint descriptors encoded/generated at step 310, the mobile device processor 110, which is configured by executing the software modules 130, including, preferably, the analysis module 172, analyzes a plurality of subsequent frames to identify the corresponding keypoints in each of the subsequent images in the sequence of images. More specifically, the pixels defining the local keypoint descriptors are detected in the subsequent image frames and spatial and dynamic information for the detected pixels is extracted. Such dynamic information includes the relative movement of the pixels throughout the series of pixel image frames. For example, the configured processor can analyze the next, say, 5-10 frames in the image sequence by applying an algorithm (e.g. Lukas Kanade or Brox algorithms and the like) to detect the pixels corresponding to the keypoints in each of the images in the sequence. The configured processor can track the position of a sparse or dense sample set of pixels throughout the frames and record the positions.

The relative position (e.g. movement) of a pixel from one image frame to another is referred to as the "optical flow displacement" or "flow". It should be understood that the optical flow displacement can also be sampled using other multi-frame, recursive analysis methods.

The configured processor can quantize the total amount of points by populating them spatially and temporally in histogram bins that can be encoded in the memory of the mobile device. Wherein each bin represents how much 'optical flow' and spatial 'gradients' exist in the clusters of pixels associated with a particular keypoint descriptor.

Preferably, the configured processor can populate the histograms, according to algorithms, including but not limited to, HOOF, HOG or SIFT and the like. Accordingly, the paths can be defined as histograms of oriented gradients (temporal or spatial) and histograms of oriented flows.

Temporal gradients represent the change in position over time (direction, magnitude, time between the image frames) e.g., flow of a pixel or pixels. For example, a pixel intensity identified in the first image frame that is then identified at another pixel location in a second image frame in the sequence, can be expressed as a temporal gradient. Spatial gradients represent the difference of intensities around a particular pixel or groups of pixels in an image frame. For example, the intensity of a pixel X in a first image frame and the intensity of surrounding pixels X−1, X+1, Y−1, Y+1, can be represented as a oriented gradient showing the difference in intensity between X and surrounding pixels X−1, X+1, etc. By way of further example, a black pixel right next to a white pixel that is right next to a black pixel is a very strong gradient whereas three white pixels in a row have no gradient.

Accordingly, both spatial and temporal information is defined in the histograms. Coupling such spatial information and temporal information enables a single Vitruvian characterization to be both a function of single image content as well as of dynamic motion content over time throughout multiple images.

It should be understood that one or more pre-processing operations can be performed on the image frames prior to performing steps 310 and 315. By example and without limitations, pre-processing on the image data prior to analysis can include scaling, orienting the image frames in coordinate space and the like as would be understood by those skilled in the art.

It should also be understood that additional pre-processing operations can be performed by the configured processor on the spatial and temporal information before populating the information in the histograms. By example and without limitation, pre-processing can include, Computing algebraic combinations of the derivatives of the tracked flow paths, deepr, spatial derivative textures, motion boundary histograms akin to Inria CVPR 2011, Kalman, filters, stabilization algorithms and the like.

Then at step 320, the salient pixel continuities are identified. The mobile device processor 110, which is configured by executing the software modules 130, including, preferably, the analysis module 172, can identify salient pixel continuities by analyzing the "optical flow" of the pixels throughout the sequence of frames and recorded in the histograms.

In general, the path of movement of one or more pixels can be analyzed and compared to prescribed criteria in order to determine what characteristic the flow exhibits (e.g., is flow representative of a static pixel, a continuously changing position, of non-fluid motion such as jumping around the image frame, etc.). Preferably, the salient pixel continuities are those pixels and groups of pixels that have optical flow values that are continuous.

More specifically, the configured processor can compare the optical flow gradients of a pixel to a prescribed set of continuity criteria which are defined to ensure the presence of flow dynamics. For example and without limitation, continuity criteria can include but is not limited to, the presence of deeper derivatives on the flow tracks of the pixel defining a particular keypoint. If the pixel associated with a particular keypoint has flow that meets the continuity criteria the particular pixel can be identified as salient continuities.

It should be understood that, because histogram bins are essentially distributions of pixel areas, the configured processor can analyze flow on a pixel by pixel basis or greater groups of associated pixels (e.g., multiple pixels defining a particular keypoint).

Then at step 325, Vitruvian primitives are computed according to the salient pixel continuities identified at step 320. The Vitruvian primitives are computational constructs that characterize a particular user's Vitruvian region according to the spatial arrangement of features identified at step 310 and dynamic information identified at 315. More specifically, the primitives are computed, using the configured mobile device processor, on the space of histogram distributions. Because the space of histograms can be very computationally expensive and mobile devices are generally not as computationally powerful as traditional biometric authentication systems, the Vitruvian primitives can be computed on the space of histograms thereby resulting in histograms that are lower in computational complexity.

The configured processor, can expand the spatial keypoint binning to higher algebraic combinations of gradient forms, thereby resulting on all possible spatiotemporal distributions of binned quantities. The configured processor can compute the features in a short spatiotemporal domain, for example, up to 5 pixel image frames. However, it should be understood that shorter or longer spatiotemporal domain can be used. For example, when applying Eulerian coupling a longer domain is preferable.

Then at step 330, the Vitruvian primitives are stored by the configured processor in the memory of the mobile device as a Vitruvian identifier. In addition, the configured processor can generate and store one or more biometric identifiers which includes at least the Vitruvian identifier.

It should be understood that while routine 300 is described in reference to generating a Vitruvian identifier, such terms should not be interpreted as limiting, as the routine 500 is applicable to the extraction and characterization of any number of biometric features from imagery of any portion(s) of an individual's body, including but not limited to, the user's face, eyes (including the iris) and/or periocular region to define a biometric identifier. Moreover, the routine 300 is also applicable to the identification and characterization of features from imagery of non-human subjects.

It can also be appreciated that, in addition to characterizing a user by generating a Vitruvian identifier according to routine 300 as described above, additional biometric features can be extracted from the image sequence captured at step 305, or captured separately from step 505. Such additional biometric features can include by way of example and without limitation, soft biometric traits. "Soft biometric" traits are physical, behavioral or adhered human characteristics as opposed to hard biometrics such as fingerprints, iris, periocular characteristics and the like which are generally invariant. However, it should be understood that certain features within the periocular region can offer information about features that can be used as soft biometrics, such as eye-shape. By way of further example, soft biometric traits can include physical traits such as skin textures, or skin colors. Soft biometrics can also include motion as detected by smartphone gyroscope/accelerometer, eye motion characteristics as detected by eye tracking algorithms and head motion characteristics as detected by tracking the movement of a face and/or head.

Such biometric features can be extracted and characterized according to the foregoing method as well as existing biometric analysis algorithms. In addition, the additional characterizations of the user's biometric features can be encoded as part of the Vitruvian identifier concurrently to execution of the exemplary routine 300, or otherwise included in a biometric identifier which includes the Vitruvian identifier, for example by fusing the soft biometric identifiers with the Vitruvian identifier.

It should also be understood that the biometric identifier is not limited to including the exemplary Vitruvian identifier and can include any number of alternative biometric representations of a user such as identifiers generated according to known biometric identification modalities (e.g., iris, face, voice, fingerprint, and the like).

According to another salient aspect of the subject application, in addition to characterizing a user's biometric features, extracting dynamic information and recording the temporal gradients e.g., 'flow', the biometric identifier that is generated according to the exemplary routine 300 is also indicative of the liveness of the user. Accordingly, in addition to generating a Vitruvian identifier according to a sequence of images, process 300 can also be implemented to generate a liveness identifier for the purposes of determining the liveness of user. As such, the configured mobile device processor employing one or more of the steps of process 500, can extract and record dynamic information of local key points in the images, and analyze the dynamic information to, at a minimum, identify salient continuities that exhibit flow to define a liveness identifier. It should be understood that the liveness identifier can be separate from or incorporated into the Vitruvian identifier generated by exemplary process 300. As such, references to liveness identifier can be interpreted as a distinct identifier or as part of the Vitruvian identifier.

Figure 4:
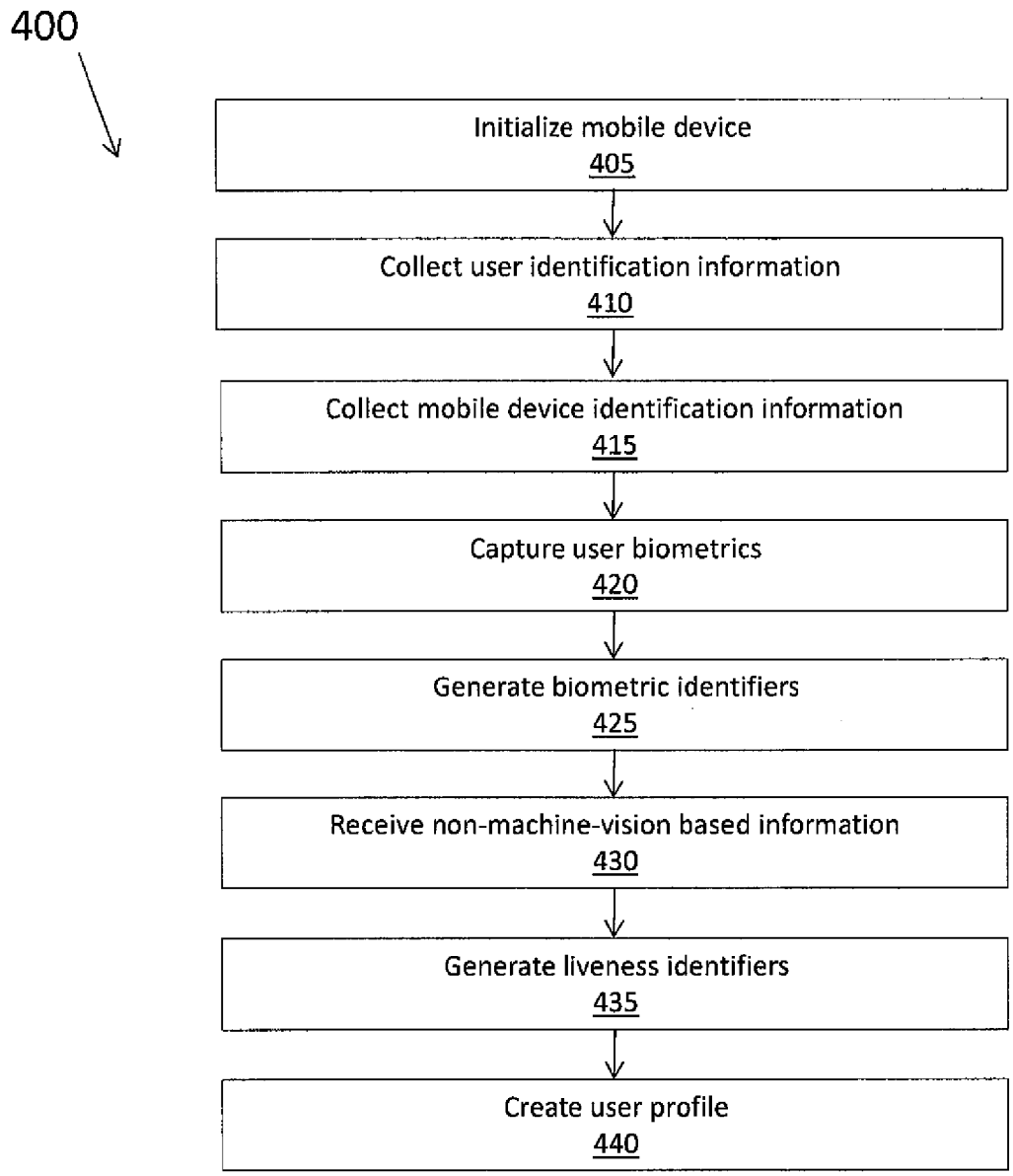
FIG. 4 is a flow diagram showing a routine for enrolling a user in accordance with at least one embodiment disclosed herein.

FIG. 4 is a flow diagram illustrating a routine 400 for enrolling the user 124 with the system 100. The enrollment process verifies the user's identity to ensure that the user is who they say they are and can also specify the manner in which the user 124 and the mobile device 101a are identified to the system server 105. In addition, enrollment can create a user profile which associates the user 124 with user devices (e.g., user's mobile device 101a and/or the user computing device 101b) and with one or more of the user's transaction accounts. Enrollment also includes capturing (e.g., reading) the user's biometrics features, generating one or more biometric identifiers characterizing those features and determining the user's liveness. These steps can be performed for verification as well as to establish a baseline for future verification sessions as further described herein. Accordingly, it can be appreciated that many of the steps discussed in relation to FIG. 4 can be performed during subsequent user authentication sessions as discussed in relation to FIG. 5.

The process begins at step 405, where the mobile device processor, which is configured by executing instructions in the form of one or more software modules 130, preferably, the enrollment module 176, the biometric capture module 172, the communication module 182, the database module 178, the analysis module 174 and/or the authentication module 180 initializes the various mobile device components to determine their respective operability and capabilities.

Initialization can be performed during the initial enrollment process and can also be performed during subsequent biometric capture/authentication processes. However, it should be understood that some or all of the steps need not be performed with each initialization and can be performed upon initial enrollment and/or periodically thereafter. By way of non-limiting example, initialization of a mobile device to facilitate biometric authentication using a mobile device are described herein and in co-pending and commonly assigned U.S. Patent Application Ser. No. 61/842,800.

Then at step 410, the mobile device 101a collects user identification information. More specifically, the mobile device processor 110, which is configured by executing one or more software modules 130, including, preferably, the enrollment module 176 and the user interface module 170, can prompt the user to input the user identification information and receive the user inputs via the user interface 115. The user identification information can include information about the user's identity (e.g., name, address, social security number, etc). In addition, user identification information can include information about one or more transaction accounts. For example, the user can enter pre-existing log-in and passwords associated with the user's various transaction accounts (e.g., online banking accounts, website log-ins, VPN accounts and the like) or actual transaction account details (e.g., bank account numbers, routing numbers, debit/credit card numbers, expiration dates and the like). Preferably such information is stored in an encrypted manner on the mobile device 101a storage. In addition, some or all of the user identification information can also be transmitted to the system server 105 via the communications network for storage remotely.

Then at step 415, mobile device identification information is collected. Mobile device identification information can include but is not limited to at least a portion of the DeviceID, AndroidID, IMEI, CPU serial number, GPU serial number and other such identifiers that are unique to the mobile device. More specifically, the mobile device processor 110, which is configured by executing one or more software modules 130, including, preferably, the enrollment module 176, can query the various hardware and software components of the mobile device 101a to obtain respective device identification information. Using the mobile device identification information the configured mobile device processor or the system server can generate one or more mobile device identifiers that uniquely identify the mobile device as further described herein.

Then at step 420, the user's biometrics features are captured using the mobile device 101a. In some implementations, the mobile device processor 110, which is configured by executing one or more software modules 130, including, preferably, the enrollment module 176, the analysis module 174, the user interface module 170, and the biometric capture module 172, prompts the user to capture imagery of the user's iris/irises, eye(s), periocular region, face (e.g., the Vitruvian region) or a combination of the foregoing using the mobile device camera 145 and stores a sequence of images to storage 190 or memory 120.

In some implementations, the configured processor 110 can also cause the microphone 104 to capture the user's voice through a microphone in communication with the mobile device and record the audio data to the device memory. For example, the user can be prompted to say words or phrases which are recorded using the microphone. The mobile device can capture images of the user's face, eyes, etc. while recording the user's voice, or separately.

Then at step 425, one or more biometric identifiers are generated from the captured biometric information and are stored to complete the enrolment stage. More specifically, the mobile device processor 110, which is configured by executing one or more software modules 130, including, preferably, the biometric capture module 172, the database module 178, the analysis module 174, can analyze the biometric information captured by the camera and generate a biometric identifier (e.g., "a Vitruvian identifier") as further described herein and in reference to FIG. 3.

In some implementations, the user's voice biometric features can be characterized as a voice print such that the user can be biometrically authenticated from characteristics of the user's voice according to voice speaker identification algorithms. For example, the audio component of the user's biometric information can be analyzed by the mobile device processor according to the voice speaker identification algorithms to create a voice print for the user which can be stored by the mobile device. The various technologies used to process voice data, generate and store voice prints can include without limitation, frequency estimation, hidden Markov models, Gaussian mixture models, pattern matching algorithms, neural networks, matrix representation, vector quantization and decision trees. Accordingly, the user can be authenticated/identified or liveness determined by analyzing the characteristics of the user's voice according to known voice speaker identification algorithms as further described herein.

In some implementations, the configured mobile device processor 110 can determine if the biometric information captured is sufficient to generate adequate biometric identifiers. If the biometric features are not identified with sufficient detail from the biometric information captured (e.g., imagery, audio data, etc.), the configured mobile device processor can prompt the user to repeat the biometric capture process via the display or other such output of the mobile device 101a. In addition, the configured mobile device processor 110 can provide feedback during and after capture thereby suggesting an "ideal scenario", for example and without limitation, a location with adequate visible light, the appropriate distance and orientation of the camera relative to the user's face and the like.

Moreover, in some implementations, the configured mobile device processor can analyze the light captured by the camera and the light spectrum that can be emitted by light emitters on the mobile device, and adjust the frequency of the light emitted during the capture step so as to improve the quality of the biometric information captured by the camera. For example, if the configured processor is unable to generate a biometric identifier, and determines that the user has darker colored eyes, the processor can cause the camera to recapture the image data and cause the light emitter to emit light frequencies that are, say, as close to the infra-red spectrum as possible given the particular mobile device's capabilities so as to capture more features of the user's iris.

In addition to generating the one or more biometric identifiers as discussed above, the configured mobile device processor can also generate identifiers incorporating multiple instances of one or more biometric identifiers. For example, during the enrollment process, the configured mobile device processor can capture and analyze multiple sequences of biometric information so as to generate multiple biometric identifiers that, collectively, are adequate virtual representations of user 124 across the multiple captures (e.g., to ensure that the configured processor has "learned" enough biometric information for user 124). Accordingly, the biometric capture portion of the enrollment process can be performed several times at various intervals and locations so as to capture the user's biometric information in various real-world scenarios, thereby increasing the likelihood that future authentication will be positive and without error. It should be understood that the multiple biometric identifiers can be stored separately and/or combined into a single identifier.

In addition or alternatively, multi-modal biometric identifiers can be generated by fusing identifiers generated according to different biometric identification modalities to create a multi-dimensional biometric identifier that is a combined biometric representation of the user. For example, the mobile device processor configured by executing one or more modules including, preferably, the analysis module 174, can combine the user's voice print(s) and the Vitruvian identifier(s).

At step 430, the mobile device processor 110, which is configured by executing one or more software modules 130, including, preferably, the capture module 172, can also receive non-machine-vision based information. Non-machine-vision based information generally relates to behavioral characteristics of the user 124 during enrollment and subsequent authentication sessions that are indicative of the user's identity as well as the user's liveness. For example and without limitation, non-machine-vision based information can include a time received from an on-board clock, a location received from GPS device, how far from the user's face the camera is positioned during image capture calculated from imagery or other on-board proximity measuring devices, the orientation of the mobile device and acceleration of the mobile device received from an accelerometer, RF radiation detected by an RF detector, gravity magnetometers which detect the Earth's magnetic field to determine the 3-dimensional orientation in which the phone is being held, light sensors which measure light intensity levels and the like.

In some implementations, the non-machine-vision based information is received over time and stored such that the configured processor can determine patterns in the information that are unique to the user 124 by applying behavioral algorithms. Accordingly, during later authentication stages, the current non-computer-vision based data collected can be analyzed and compared to the user's established behavioral traits to verify the user's identity as well as determine whether the information is indicative of liveness. For example, time and location based behavioral patterns can be identified over time and the current position compared to the pattern to determine if any abnormal behavior is exhibited. By way of further example, the particular "swing" or acceleration of the mobile device during multiple authentication processes can be characterized as a behavioral trait and the particular swing of the current authentication can be compared to identify abnormal behavior. By way of further example, the device orientation or distance from the user's face can also be similarly compared. By way of further example, an RF radiation signature for the user can be established during enrollment and compared to future measurements to identify abnormal RF radiation levels suggesting the use of video screens to spoof the system.

At step 435, the mobile device processor configured by executing one or more software modules 130, including, preferably, the analysis module 174, can generate one or more liveness identifiers which characterize the captured user's biometrics and/or the non-machine-vision based information that are indicative of the user's liveness. As noted above, determining liveness is an anti-spoofing measure that can be performed during enrollment and subsequent authentication sessions to ensure that the image sequence captured by the imaging device is of a live subject and not a visual representation of the user by, say, a high resolution video.

In some implementations, the process for generating biometric identifiers, as discussed at step 425 and process 300, can be used to generate a liveness identifier and/or determine the user's liveness. More specifically, the configured mobile device processor, employing the steps of process 300, can extract and record dynamic information of Vitruvian biometric features and encode the features as a unique liveness identifier. In addition, it should be understood that the configured processor can analyze the dynamic information to identify fluid motion of the features within the image sequence that are indicative of a living subject (i.e., liveness) because every time the user enrolls or validates, the user will actually move a little no matter how steady he/she is trying to be. More particularly, liveness can be determined from analysis of the dynamic movement of low-level Vitruvian features to determine if the flow is representative of continuous motion. Similarly, liveness can also be determined by the movement of intermediate level features such as the eyes, mouth, and other portions of the face.

In addition or alternatively, the configured processor can generate a liveness identifier and/or determine liveness according to the Eulerian motion magnification algorithms also referred to as Eulerian video magnification (EMM or EVM). EMM can be used to amplify small motions of the subject captured in the images, for example, flushing of the subject's skin during a heartbeat. In some implementations, when employing EMM, the camera (e.g., the smartphone camera) and the subject are still, however, the configured processor can use EMM to detect these small motions of the subject even while the device is moving using video stabilization.

In some implementations, a liveness identifier can be generated and liveness determined, by analyzing lip movement, pupil dilation, blinking, and head movement throughout the image sequence. Moreover, a liveness identifier can also be generated and liveness determined by analyzing the audio recording of the user voice as would be understood by those skilled in the art. Moreover, in some implementations, liveness can also be determined from analyzing the light values associated with low-level, intermediate and/or high level features represented in a single image. In addition, such light values can also be analyzed throughout multiple image frames in the sequence to determine abnormal light intensities throughout multiple frames.

In addition, the non-machine-vision based information including, time received from an on-board clock, location received from a gps device, how far from the user's face the camera is positioned during image capture as calculated from imagery received from the camera or other on-board distance measuring device, the mobile device orientation during feature acquisition, acceleration of the mobile device while the mobile device is drawn into position for acquisition as received from an accelerometer can all be used to generate an identifier characterizing the user's unique behavioral characteristics and/or analyzed to determine if the information is indicative of the user's liveness during registration and authentication sessions.

It should be understood that one or more liveness identifiers generated according to the computer vision based and non-machine-vision based methods can be analyzed and stored individually or combined to generate one or more multi-dimensional liveness identifiers.

Then at step 440, a user profile is generated and stored. The user profile can include one or more pieces of user identification information and mobile device identification. In addition the user profile can include information concerning one or more of the user's transaction accounts as well as settings that can be used to guide the operation of the system 100 according to the user's preferences. In addition, the biometric identifiers can be stored locally on the mobile device 101*a* in association with the user's profile such that the mobile device can perform biometric authentication according to the biometric identifiers. In addition or alternatively, the biometric identifiers can be stored in association with the user's profile on a remote computing device (e.g., system server 105 or remote computing device 102) enabling those devices to perform biometric authentication of the user.

In some implementations, a unique user identifier (a "userId") and an associated mobile device identifier (a "mobileId") can be generated and stored in a clustered persistent environment so as to create the profile for the user. The userId and mobileId can be generated using one or more pieces of the user identification information and mobile device identification information, respectively. It should be understood that additional user identification information and mobile device identification information can also be stored to create the user profile or stored in association with the user profile. In addition, the userId and associated mobileId can be stored in association with information concerning one or more of the user's transaction accounts.

At this juncture, it can be appreciated that the userId can be used to map the user profile to the user's legacy transaction accounts. In addition, the mobileId ties the device to a user profile. It can also be appreciated that user profiles can be created by the system server 105 and/or the mobile device 101*a*. Moreover, one or more instances of a user profile can be stored on various devices (e.g., system server 105, mobile device 101*a*, remote computing device 102, or user computing device 101*b*). In addition, the information included in the various instances of the user's profiles can vary from device to device. For example, an instance of the user profile which stored on the mobile device 101*a* can include the userId, mobileId, user identification information and sensitive information concerning the user's transaction accounts, say, account numbers and the like. By way of further example, the instance of the user profile stored by the system server 105 can include the userId, mobileId, other unique identifiers assigned to the user and information that identifies the user's transaction accounts but does not include sensitive account information.

Figure 5:
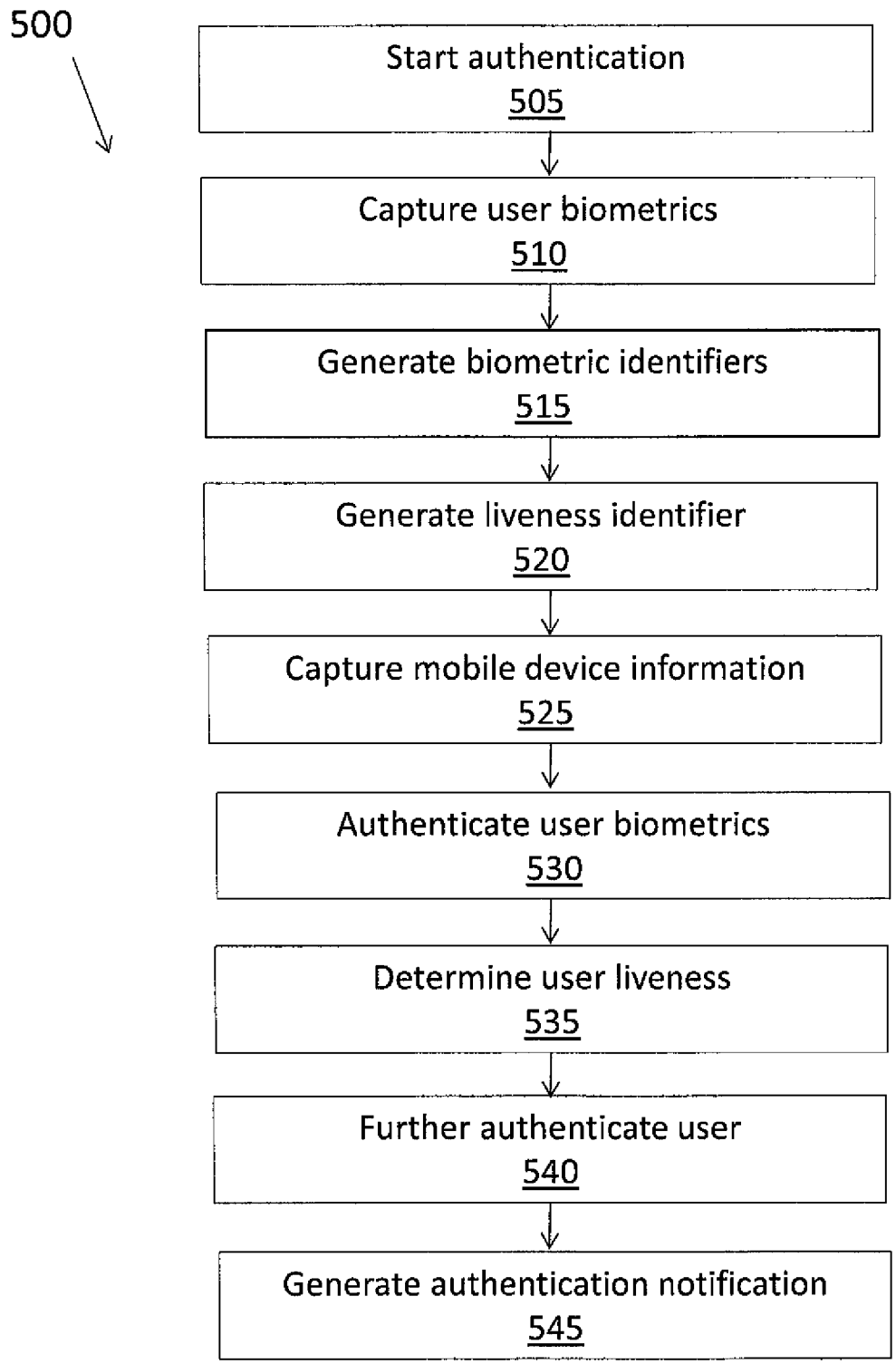
FIG. 5 is a flow diagram showing a routine for authenticating a user according to the user's biometric features in accordance with at least one embodiment disclosed herein.

Turning now to FIG. 5, which is a flow diagram that illustrates a routine 500 for authenticating a user 124 and facilitating access to networked environments in accordance with at least one embodiment disclosed herein.

The process begins at step 505, where the mobile device 101*a* receives a request to authenticate the user 124. In some implementations, authentication can be commenced by receiving a user input by the mobile device 101*a*. For example, the user can launch the secure authentication client application causing authentication to begin. In some implementations, the mobile device 101*a* can begin the authentication process automatically. For example, the mobile device can prompt the user to authenticate upon detecting that the user has used the mobile device to access a networked environment requiring user authentication as specified by the user settings or by the enterprise organization that operates the networked environment.

In some implementations, the system server 105 can cause the mobile device 101*a* to begin authentication in response to a request for authentication identifying the user. For example, the request can be received by the system server directly from a remote computing device 102 controlling access to a networked environment (e.g., a financial institution system, a networked computing device that controls an electronic door lock providing access to a restricted location, a web-server that requires user authentication prior to allowing the user to access a website). Preferably, the authentication request identifies the user 124 thereby enabling the system server 105 to cause the appropriate user's mobile device to commence authentication.

Then at step 510, the mobile device processor 110, which is configured by executing one or more software modules, including, the authentication module 180, the user interface module 170, the analysis module 174 and the capture module 172, captures the user's current biometric information. In addition, the configured processor can also capture current non-machine-vision based information as well as current mobile device identification information. The capture of such information can be performed by the mobile device in the manner described in relation to steps 420 and 430 of FIG. 4.

Then at step 515, the mobile device processor 110, which is configured by executing one or more software modules, including, the authentication module 180, the user interface module 170, the analysis module 174, generates one or more current biometric identifiers in the manner described in relation to FIG. 4 and FIG. 3.

Then at step 520, the mobile device processor 110, which is configured by executing one or more software modules, including, the authentication module 180, the user interface module 170, the analysis module 174, can generate one or more current liveness identifiers using the current biometric information and/or current non-machine-vision based information in the manner described in relation to FIG. 4 and FIG. 3.

In addition, at step 525, the mobile device processor 110, which is configured by executing one or more software modules, including, the authentication module 180, the user interface module 170, the capture module 172 and the analysis module 174, can extract the mobile device identification information that is currently associated with the mobile device 101*a* and generate a current mobile identifier substantially in the same manner as described in relation to step 415 of FIG. 4. Similarly, the configured mobile device processor 110 can also capture user identification information and generate a current user identifier substantially in the same manner as described in relation to step 410 of FIG. 4. It should be understood that such information and a mobile device identifier and a user identifier need not be generated with each authentication session. In addition or alternatively, previously generated identifiers, say, the mobileId and userId generated during initial enrollment, can be used to identify the mobile device and user.

Then at step 530, the user is authenticated according to at least a portion of the one or more current biometric identifiers. Using the current biometric identifiers, the user's identity can be authenticated by comparing the biometric identifiers to one or more stored biometric identifiers that were previously generated during the enrollment process or subsequent authentication sessions. It should be understood that the biometric authentication step is not limited to using the exemplary Vitruvian biometric identifiers and can utilize any number of other biometric identifiers generated according to various biometric identification modalities (e.g., iris, face, voice, fingerprint, and the like).

In some implementations, the mobile device processor, configured by executing one or more software modules 130, including, preferably, the authentication module, authenticates the user 124 by matching at least a portion of the one or more current biometric identifiers generated at step 515 to the previously generated version(s) and determining whether they match to a requisite degree. For example, the configured mobile device processor can apply a matching algorithm to compare at least a portion of the current biometric identifiers to the stored versions and determine if they match to a prescribed degree. More specifically, in an exemplary matching algorithm, the process of finding frame-to-frame (e.g., current identifier to stored identifier) correspondences can be formulated as the search of the nearest neighbor from one set of descriptors for every element of another set. Such algorithms can include but not limited to the brute-force matcher and Flann-based matcher.

The brute-force matcher looks for each descriptor in the first set and the closest descriptor in the second set by comparing each descriptor (e.g., exhaustive search). The Flann-based matcher uses the fast approximate nearest neighbor search algorithm to find correspondences. The result of descriptor matching is a list of correspondences between two sets of descriptors. The first set of descriptors is generally referred to as the train set because it corresponds to a pattern data (e.g., the stored one or more biometric identifiers). The second set is called the query set as it belongs to the "image" where we will be looking for the pattern (e.g., the current biometric identifiers). The more correct matches found (e.g., the more patterns to image correspondences exist) the more chances are that the pattern is present on the image. To increase the matching speed, the configured processor can train a matcher either before or by calling the match function. The training stage can be used to optimize the performance of the Flann-based matcher. For this, the configured processor can build index trees for train descriptors. And this will increase the matching speed for large data sets. For brute-force matcher, generally, it can store the train descriptors in the internal fields.

In addition, at step 535, the user is further authenticated by verifying the user's liveness. In some implementations, liveness of the user can be determined by comparing at least a portion of the one or more current liveness identifiers generated at step 520 with the previously generated versions and determining whether they match to a requisite degree. As noted above, verifying the user's liveness can also include analyzing the captured biometric and non-machine-vision information and/or the liveness identifier(s) to determine whether they exhibit characteristics of a live subject to a prescribed degree of certainty. In some implementations, the configured processor 110 can analyze the dynamic information encoded in the liveness identifier to determine if the information exhibits fluid motion of the biometric features within the image sequence that are indicative of a living subject. More particularly, liveness can be determined from analysis of the dynamic movement of low-level Vitruvian features to determine if the flow is representative of continuous motion. Similarly, liveness can also be determined by the movement of intermediate level features such as the eyes, mouth, and other portions of the face. Similarly, liveness can be determined by comparing the movement of the user's intermediate level features with one or more other biometric characterizations of the user to determine if they correspond. For example, the user's lip movements can be compared to the user's voice print to determine whether the lip movement corresponds to the words spoken by the user during the capture process at step 510.

Whether liveness is determined by matching liveness identifiers according to a matching algorithm or by analyzing the information captured at step 510 or liveness identifiers generated at step 520 for indicators of liveness can be dependent on environmental constraints, for example, lighting. More specifically, if the biometric information is captured in poor lighting conditions, liveness can be determined using matching algorithms. Alternatively, if the biometric information is captured under adequate lighting conditions, liveness can be determined by analyzing the captured information and/or the generated identifiers which characterize the biometric information.

Moreover, the current non-computer-vision based information collected at step 510 can also be analyzed and compared to the user's established behavioral traits to determine whether they match to a prescribed degree. For example, time and location based behavioral patterns can be identified over time and the current position compared to the pattern to determine if any differences (e.g., abnormal behavior) are exhibited. By way of further example, the particular "swing" or acceleration of the mobile device during multiple authentication processes can be characterized as a behavioral trait and the particular swing of the current authentication can be compared to identify abnormal behavior. By way of further example, the device orientation or distance from the user's face can also be similarly compared. It should be understood that this analysis can be performed to determine liveness as well as to authenticate the user's identity in connection with step 535.

Then, at step 540, the information identifying the user and mobile device is verified. In some implementations, the mobile device processor 110, which is configured by executing one or more software modules 130, including preferably, the authentication module 180 and the communication module 182, can generate a request to verify the user's identity and transmit the request to the system server 105. For example and without limitation, the request can include: information identifying the user (e.g., user identification information or a user identifier generated during authentication or enrollment); information identifying the mobile device (e.g., mobile device identification or a mobile device identifier generated during authentication or enrollment); information indicating whether the user has been biometrically authenticated; information concerning the networked system that the user is attempting to access.

In response to receipt of the request, the system server 105 can cross-reference the user identified in the request with database of user profiles to determine whether the user is associated with a user profile and, hence, is enrolled with the system 100. Likewise, the system server can determine whether the mobile device identified by the request is also associated with the user profile. For example, the system server 105 can compare a received current userId to the userId stored in the user profile to determine if they match. Likewise the system server 105 can match a received current mobileId to a previously stored mobileId to determine if they match and are associated with the same user.

It should be understood that, the steps for authenticating the user according to the biometric identifiers, liveness identifiers, the user identification information and/or mobile device identification information can be performed by the system server 105 or the mobile device 101*a*, or a combination of the foregoing.

Then at step 545, an authentication notification is generated according to whether the user has been authenticated. In some implementation, the system server 105 can transmit the authentication notification directly to the secure networked environment that the user is attempting to access or indirectly via one or more computing devices being used by the user to access the networked environment (e.g., mobile device 101*a* or user computing device 101*b*). For example, the authentication notification can be transmitted to a remote computing device 102 that controls access to a secure networked environment. By way of further example, the authentication notification can be transmitted to the mobile device 101*a* or the user computing device 101*b* with which the user is attempting to gain access to a secure networked environment using a transaction account with that server. Accordingly, based on the authentication notification, any such remote computing device which receives the authentication notification can grant access to the user and/or further process the requested transaction accordingly.

The substance and form of the authentication notification can vary depending on the particular implementation of the system 100. For example, in the case of user attempting to access a website, the notification can simply identify the user and indicate that the user been biometrically authenticated and the user identity has been verified. In addition or alternatively, the notification can include information concerning one or more transaction accounts, say, the user's log-in and password information or a one-time password. In other instances, say, when user is trying to complete a financial transaction, the notification can include the user's payment data, transaction authorization and the like. In some implementations, the authentication notification can include a fused key, which is a one-time authorization password that is fused with one or more biometric, mobile, or liveness identifiers, user identification information and/or mobile device identification information, and the like. In such an implementation, the computing device receiving of the authentication notification can un-fuse the one time password according to biometric, mobile and/or liveness identifiers previously stored by the remote computing device.

At this juncture, it should be noted that although much of the foregoing description has been directed to systems and methods for authenticating a user according to the user's biometric features, the systems and methods disclosed herein can be similarly deployed and/or implemented in scenarios, situations, and settings far beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authenticating a user according to the user's biometrics. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A computer implemented method for authenticating a user according to the user's biometric features, the method comprising:
   capturing, by a mobile device having a camera, a storage medium, instructions stored on the storage medium, and a processor configured by executing the instructions, a plurality of images depicting at least one facial region of the user,
   capturing, by the processor and a microphone communicatively coupled to the processor, an audio data file including a recording of the user's voice, wherein the audio data file is captured concurrent to capturing the plurality of images by the processor using the camera;
   detecting, by the processor from a first image of the plurality of images, a plurality of facial features depicted in the first image;
   determining, by the processor from the first image, a first position of the facial features, wherein the first position of each facial feature is relative to a respective position of each of at least one other facial feature;
   determining, by the processor from each of at least one other image of the plurality of images, at least one second respective position of each of the facial features;
   calculating, by the processor as a function of determining the first position and the at least one second respective position, changes in position of each of the facial features;
   generating, by the processor from the audio data file, a voice print characterizing the user's voice and usable to identify the user;
   generating, by the processor, a first biometric identifier that is useable to identify the user as a function of the first position of the facial features and, wherein the generating step includes encoding, in the first biometric identifier, intensity values for a plurality of pixels depicting respective facial features detected in the first image as spatial gradients;
   encoding, in at least one biometric identifier, the calculated changes in position of the facial features as temporal gradients, wherein the temporal gradients correspond to the pixels depicting respective facial features detected in the first image, and wherein the temporal gradients represent a difference between a location of the pixels depicting respective facial features in the first image and respective locations of pixels depicting the respective facial features in the at least one other image;
   authenticating, by the processor, the user by:
      comparing the first biometric identifier to at least one previously generated biometric identifier,
      comparing the voice-print to at least one previously generated voice-print, and
      comparing the calculated changes in position of the facial features to the voice-print;
   generating, by the processor in response to authenticating the user, an identity verification request that includes information identifying the user and the mobile device, and includes an indication that the user has been biometrically authenticated by the mobile device;
   transmitting, by the processor to a remote server device over a network, the identity verification request thereby prompting the remote server device to verify the user identity;
   receiving, by the processor from the remote server device in response to the identity verification request, a notification that the user identity has been further verified by the remote server; and
   generating, by the processor, an authentication notification responsive to the user authentication and the identity verification notification.

2. The method of claim 1, further comprising:
   determining, by the processor, that the facial features represent live biometric features as a function of the calculated changes in position of the facial features and at least one predetermined continuity criteria.

3. The method of claim 2, further comprising:
   determining, by the processor, that the calculated changes in position of each of the facial features have values representing continuous changes of position.

4. The method of claim 3, wherein the determining step is performed according to at least one predetermined continuity criteria.

5. The method of claim 1, wherein the step of determining the first position of the facial features further comprises:
   determining, by the processor, for each of the facial features, a location of the plurality of pixels depicting the respective facial features in the first image.

6. The method of claim 5, wherein the step of determining the at least one second respective position further comprises:
   determining, by the processor in the at least one other image, respective locations of a plurality of pixels depicting the respective facial features in each of the at least one other image.

7. The method of claim 6, wherein the step of calculating changes in position of each of the facial features further comprises:
   calculating, by the processor, the changes in position of the respective facial features in accordance with the determined location of the plurality of pixels depicting the respective facial features in the first image and the determined respective locations of the plurality of pixels depicting the respective facial features in each of the at least one other image.

8. The method of claim 1, wherein the images depict at least a portion of the user's periocular region, eyes and face.

9. The method of claim 1, wherein the images include pixel image data captured in at least one light spectrum selected from a group consisting of: visible light, near infra-red light, and infra-red light.

10. The method of claim 1, further comprising:
    wherein the voice print is a second biometric identifier; and
    generating, by the processor, a composite biometric identifier by fusing the second biometric identifier and the first biometric identifier.

11. The method of claim 1, wherein the step of authenticating comprises:
    determining, by the processor based on the comparing step, that the first biometric identifier and the previously generated biometric identifier match to a prescribed degree, that the voice print and the previously generated voice print match to a prescribed degree, and that the calculated changes in position of the facial features correspond to the voice print to a prescribed degree.

12. The method of claim 1, further comprising:
    transmitting, by the processor to a remote computing device over a network, the authentication notification.

13. The method of claim 1, the step of authenticating further comprising:
   determining, by the processor, that the at least one biometric identifier is indicative of the user being alive.

14. A system for authenticating a user according to the user's biometric features, comprising:
   a computing device having a processor, a computer-readable storage medium, instructions in the form of at least one software module stored on the storage medium, comprising:
   a biometric capture module that executes so as to configure the processor to cause a camera in communication with the processor to capture a plurality of images, wherein the plurality of images depict at least one facial region of the user and capture, using a microphone communicatively coupled to the processor, an audio data file including a recording of the user's voice, wherein the audio data file is captured concurrent to capturing the plurality of images;
   an analysis module that executes so as to configure the processor to:
      detect facial features depicted in the plurality of images, determine from at least a first image a first respective position of each facial feature relative to at least one other facial feature, determine at least one second respective position of each of the facial features in each of at least one other image of the plurality of images, calculate changes in position of each of the facial features, generate a biometric identifier useable to identify the user as a function of the first position of the facial features, wherein generating the first biometric identifier includes encoding in the biometric identifier intensity values for pixels depicting respective facial features detected in the first image as spatial gradients, and wherein the analysis module further configures the processor to encode the calculated changes in position of the facial features as temporal gradients in at least one biometric identifier, wherein the temporal gradients represent a difference between a location of the pixels depicting respective facial features detected in the first image and respective locations of pixels depicting the respective facial features in the at least one other image; and
   a biometric authentication module that executes so as to configure the processor to authenticate the user by:
      comparing the first biometric identifier to at least one previously generated biometric identifier, comparing the voice-print to at least one previously generated voice-print, and comparing the calculated changes in position of the facial features to the voice-print; and
      determining that the first biometric identifier and the previously generated biometric identifier match to a prescribed degree, that the voice-print and the previously generated voice-print match to a prescribed degree, and that the calculated changes in position of the facial features match the voice-print to a prescribed degree; and
   wherein the biometric authentication module further configures the processor to:
      generate, in response to authenticating the user, an identity verification request that includes information identifying the user and the mobile device and includes an indication that the user has been biometrically authenticated by the mobile device,
      transmit, to a remote server device over a network, the identity verification request thereby prompting the remote server device to verify the user identity,
      receive, from the remote server device in response to the identity verification request, a notification that the user identity has been further verified by the remote server, and
      generate an authentication notification responsive to the user authentication and the identity verification notification.

* * * * *